Sept. 9, 1952 — C. E. SWENSON ET AL — 2,609,904
ONE-WAY CLUTCH
Filed Feb. 1, 1949
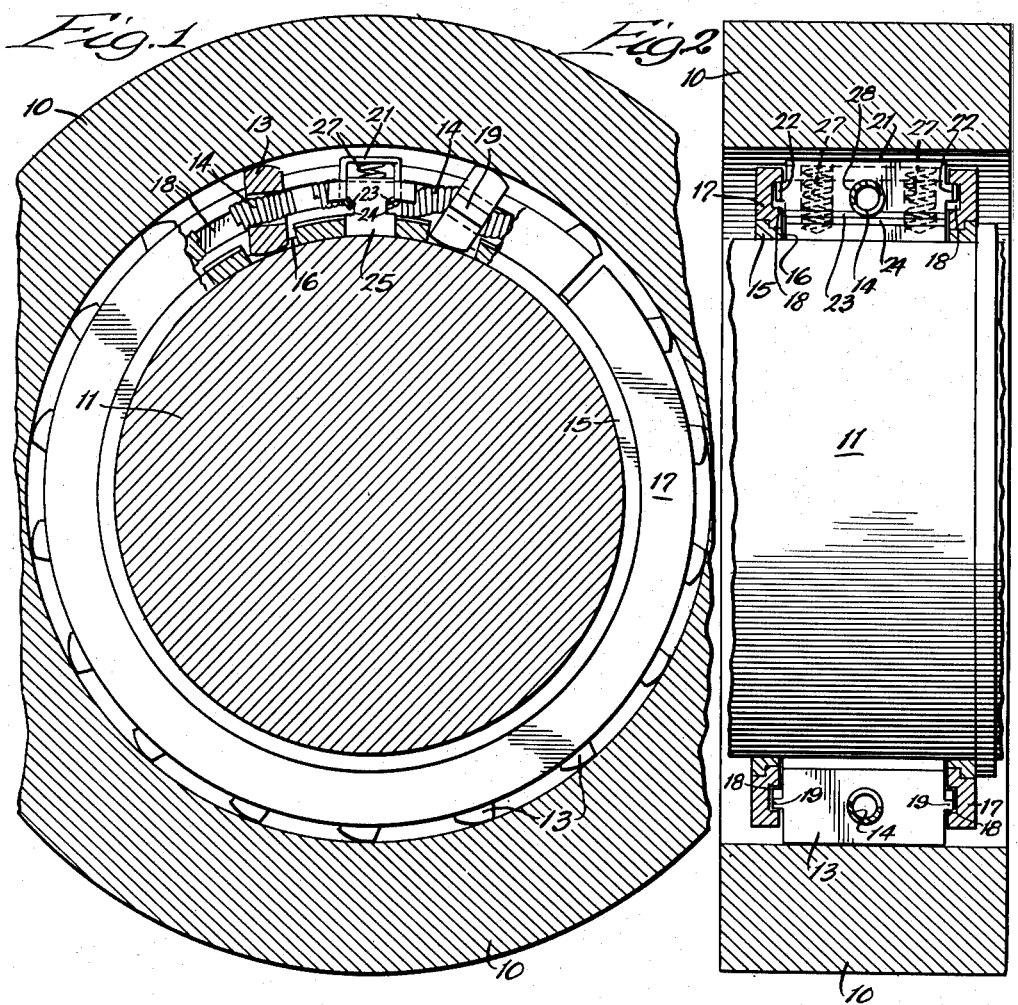
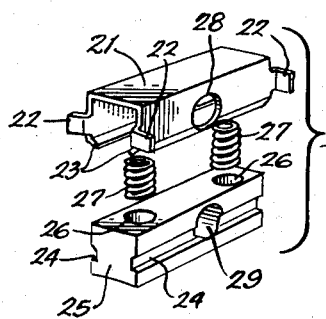
INVENTORS:
Adiel Y. Dodge and
Carl E. Swenson,
By Dawson, Ooms, Booth & Spangenberg,
Attorneys.

Patented Sept. 9, 1952

2,609,904

UNITED STATES PATENT OFFICE 2,609,904

ONE-WAY CLUTCH

Carl E. Swenson and Adiel Y. Dodge,
Rockford, Ill.

Application February 1, 1949, Serial No. 73,876

6 Claims. (Cl. 192—45.1)

This invention relates to one-way clutches and more particularly to frictional control of the cage in a one-way clutch of the tilting gripper type.

It has heretofore been proposed to control tilting of the grippers in one-way clutches by frictional engagement between the cage and one of the races. In these devices a special type of cage is required which must be carefully constructed to maintain proper frictional engagement with the race and which is difficult, if not impossible, to repair.

The present invention has for one of its objects the provision of a friction device which can be mounted in place of one of the grippers in a one-way clutch assembly to provide a friction connection between the cage and one of the races. According to one feature, the friction device is of substantially the same weight as the gripper, and one or more of the usual grippers can be replaced by the friction device without unbalancing the clutch assembly.

Another object is to provide a friction device which is formed as a complete unitary assembly to be handled and mounted in the clutch as a unit and which provides the required amount of frictional engagement with the race.

Still another object is to provide a one-way clutch in which friction between the cage and one of the races is produced by a separate friction shoe slidably carried by the cage and urged against the desired race by a spring.

The above and other objects and advantages of the invention will be more readily apparent when read in connection with the accompanying drawing, in which—

Figure 1 is a transverse section with parts in elevation through a one-way clutch assembly embodying the invention;

Figure 2 is an axial vertical section of the clutch assembly; and

Figure 3 is a perspective view showing the friction device of the invention in disassembled form.

The clutch, as shown, is adapted to connect an outer race 10 with an inner race 11 of smaller diameter so that the outer race can turn clockwise relative to the inner race but is prevented from turning counter-clockwise.

The clutch is of the tiltable gripper type employing a series of grippers 13 having their ends formed on different radii so that when they are tilted counter-clockwise they will bind between the races to connect them, and when they are tilted clockwise, they will release to permit relative rotation of the races. The grippers may be formed with central tangential openings therein to receive an annular coil spring 14 which is preferably bent laterally by engagement with the grippers so that it tends to tilt them counter-clockwise toward their engaged position.

The grippers are held assembled between the races by a cage formed by a generally cylindrical ring 15 having annular end portions and provided in its center with a series of axially extending openings 16 through which the grippers respectively may project. As shown in Figure 1, the openings 16 are somewhat wider than the grippers so that they will not interfere with normal tilting of the grippers between their engaged and released positions. The cage is completed by end rings 17 which may be split rings resiliently held on the ring 15. The inner surfaces of the end rings are formed with circumferential grooves 18 to receive projections 19 on the ends of the grippers thereby to limit both radial and tilting movement of the grippers as described in said application of Carl E. Swenson. It may also be desirable in some cases to employ a cage having relatively movable inner and outer rings as described and claimed in the patent to Dodge, No. 2,404,221.

In order to insure positive and prompt engagement of the grippers, a relatively heavy spring 14 is employed. During overrunning this spring tends to hold the ends of the grippers in engagement with the races producing a relatively rapid wear on the grippers. In order to correct this operation according to the present invention, a friction means is employed to create friction between a cage ring and the adjacent race in order that the cage ring will have a tendency to turn with the race to tilt the grippers away from the race surface. In this way a relatively heavy spring can be used without producing wear on the grippers, it being noted that all of the wear will occur on the friction member which is designed for the purpose. It thus becomes possible to utilize a heavy spring for rapid engagement of the grippers while at the same time minimizing or eliminating wear on the grippers during overrunning.

According to the present invention the frictional connection is provided by a separate unitary friction device one or more of which may be employed and which may be assembled in place of one or more of the usual grippers. As best seen in Figure 3, the friction device comprises a channel shaped housing 21 which is of substantially the same length as the grippers and which is formed at its ends with projecting tabs or lugs 22 to fit into the slots 18 thereby to hold the housing against radial movement in the cage. The edges of the legs of the housing are bent inward as shown at 23 to fit loosely into grooves 24 formed in the sides of friction shoes 25. The shoes 25 may be cut from strip bronze or like desired friction material which is extruded or otherwise formed with the section shown and which is of a size to fit slidably into the housing 21. In its upper surface the friction shoe is provided with openings 26 to receive coil springs 27 to urge the friction shoe outward of the housing.

To assemble the friction device, the springs may be inserted in the openings 26 in the friction shoe, and the shoe may then be slid lengthwise into the housing 21. Engagement of the edges 23 with the grooves 24 will hold the shoe in the housing but will permit a limited amount of movement of the shoe along the length of the springs 27.

With the friction unit assembled, it may be assembled with a series of grippers. For this purpose the housing is formed with holes 28 in its sides, and the shoe is formed with a registering enlarged hole 29 to receive the coil spring 14. When assembled on the spring, the friction device may be handled in substantially the same way as a gripper to complete the assembly by placing it in the cage with the tabs or lugs 22 fitting into the slots 17 of the cage and rings. It will be noted that the friction shoe 25 may be made wider than the grippers substantially to fill a slot 16 since no tilting of the shoe is required. Thus even though the shoe is shorter radially than the grippers and the housing is relatively light, the complete friction device will have substantially the same weight as a gripper. In this way one or more than one of the friction devices may replace grippers in the assembly without producing any unbalance.

In operation, with the friction device assembled as shown in Figures 1 and 2, radial outward movement of the housing 21 is prevented by engagement of the lugs 22 with the slots 18, and the springs 27 press the friction shoe 25 inward into engagement with the inner race. The degree of engagement can be regulated by controlling the strength of the springs, and the amount of friction produced can be controlled both by selection of the proper spring strength and of a material having a desired coefficient of friction. With the friction device in place it tends to cause the cage to turn with the inner race at all times but is capable of slipping over the inner race during overrunning of the clutch. In the event of failure or damage of a friction device, it can easily be replaced without requiring replacement of the entire clutch assembly or of the cage.

While one embodiment of the invention has been shown and described in detail herein, it will be understood that this is illustrative only and is not to be taken as a definition of the scope of the invention, reference being had for this purpose to the appended claims.

What is claimed is:

1. A friction device for use with a one way clutch comprising an elongated channel shaped housing open at one side, an elongated friction shoe in the housing slidable through the open side thereof, spring means in the housing urging the shoe therefrom, and interengaging parts on the housing and the shoe to limit relative movement therebetween.

2. A friction device for use with a one way clutch comprising an elongated channel shaped housing open at one side, an elongated friction shoe in the housing slidable through the open side thereof, spring means in the housing urging the shoe therefrom, interengaging parts on the housing and the shoe to limit relative movement therebetween and relatively narrow projections at the ends of the housing for mounting it in a clutch cage.

3. A friction device for a one way clutch comprising a channel shaped housing having the edge portions of its legs turned inward, a friction shoe fitting slidably in the housing and having grooves in its sides receiving the inwardly turned edges to limit relative movement of the shoe and housing, and a spring in the housing urging the shoe outward thereof.

4. A friction device for use in a one-way clutch of the type having an annular cage formed with openings therethrough and tiltable grippers fitting into the openings to engage races between which the cage is mounted; said friction device comprising a housing of a size and shape adapting it to fit in an opening in the cage, a friction shoe fitting slidably in the housing, a spring in the housing urging the shoe outward of the housing, and interengaging parts on the housing and the shoe to limit outward movement of the shoe relative to the housing.

5. A friction device for use in a one-way clutch of the type having an annular cage formed with openings therethrough and tiltable grippers fitting into the openings to engage races between which the cage is mounted; said friction device comprising a channel section housing of a size and shape adapting it to fit in an opening in the cage with the open side of the channel facing radially, a friction shoe fitting slidably in the housing, a spring urging the shoe outward of the housing through the open side of the channel section the shoe having grooves in its sides, and bent over edges on the housing side flanges fitting loosely in the grooves to limit outward movement of the shoe relative to the housing.

6. A friction device for use in a one-way clutch of the type having an annular cage formed with openings therethrough and tiltable grippers fitting into the openings to engage races between which the cage is mounted; said friction device comprising a channel section housing of a size and shape adapting it to fit in an opening in the cage with the open side of the channel facing radially, relatively narrow mounting projections extending outward from the ends of the housing, a friction shoe fitting slidably in the housing, a spring urging the shoe outward of the housing through the open side of the channel section, the shoe having grooves in its sides, and bent over edges on the housing side flanges fitting loosely in the grooves to limit outward movement of the shoe relative to the housing.

CARL E. SWENSON.
ADIEL Y. DODGE.

REFERENCES CITED

The following references are of record in the file of this patent:

UNITED STATES PATENTS

| Number | Name | Date |
|---|---|---|
| 277,476 | Frey | May 15, 1883 |
| 345,652 | Streeter | July 13, 1886 |
| 565,004 | Kinzer, Jr. | Aug. 4, 1896 |
| 671,528 | Royal | Apr. 9, 1901 |
| 943,730 | Beatty | Dec. 21, 1909 |
| 2,364,280 | Dodge | Dec. 5, 1944 |
| 2,389,961 | Dodge | Nov. 27, 1945 |